(12) United States Patent
Sakata et al.

(10) Patent No.: US 7,906,728 B2
(45) Date of Patent: Mar. 15, 2011

(54) METHOD OF COVERING WIRE HARNESS BRANCH SECTION WITH PROTECTOR AND BRANCH STRUCTURE OF WIRE HARNESS

(75) Inventors: Tsutomu Sakata, Yokkaichi (JP); Gousei Kobayashi, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 229 days.

(21) Appl. No.: 12/280,214

(22) PCT Filed: Dec. 14, 2006

(86) PCT No.: PCT/JP2006/324917
§ 371 (c)(1),
(2), (4) Date: Aug. 21, 2008

(87) PCT Pub. No.: WO2007/132545
PCT Pub. Date: Nov. 22, 2007

(65) Prior Publication Data
US 2010/0230157 A1    Sep. 16, 2010

(30) Foreign Application Priority Data

May 15, 2006 (JP) .................................. 2006-135000

(51) Int. Cl.
*H02G 3/04* (2006.01)
*H02G 1/00* (2006.01)

(52) U.S. Cl. .................... 174/72 A; 174/36; 174/102 R; 174/102 D; 174/93; 174/97; 439/207; 138/162

(58) Field of Classification Search ................. 174/72 A, 174/36, 102 R, 102 D, 93, 96, 97; 439/207, 439/447; 138/162
See application file for complete search history.

(56) References Cited

U.S. PATENT DOCUMENTS

| 6,087,593 A * | 7/2000 | Skipworth et al. ............. 174/135 |
| 6,229,091 B1 * | 5/2001 | Ogawa et al. ................ 174/72 A |

(Continued)

FOREIGN PATENT DOCUMENTS

JP    4-26018    1/1992

(Continued)

OTHER PUBLICATIONS

English language Abstract of JP 2000-236608, Aug. 29, 2000.
English language Abstract of JP 7-212936, Aug. 11, 1995.
English language Abstract of JP 4-26018, Jan. 29, 1992.

(Continued)

*Primary Examiner* — Dhiru R Patel
(74) *Attorney, Agent, or Firm* — Greenblum & Bernstein P.L.C.

(57) ABSTRACT

A protector includes a main body and a cover, which are a pair of T-shaped semi-annular sections formed by halving a T-shaped cylindrical body, and thin hinges connecting the main body and the cover. A setting jig is provided with a main body receiver including a main body receiving recess as an upper surface opening having a cross-sectionally arcuate shape and with a pressing wall projecting upward from one side end of the main body receiving recess. The cover of the protector in an open state is hooked and placed on the pressing wall; the main body is positioned and set above the main body receiving recess; and the T-shaped branch section of the wire harness is inserted into the main body and set into the main body receiving recess. Thereby, the cover is pressed by the pressing wall to rotate toward the main body; and locking hooks provided on the main body engage with locked portions provided on the cover, thus locking and closing the main body and the cover.

16 Claims, 5 Drawing Sheets

U.S. PATENT DOCUMENTS

| | | | |
|---|---|---|---|
| 6,234,429 B1 * | 5/2001 | Yang | 248/74.1 |
| 6,417,453 B1 * | 7/2002 | Lapp et al. | 174/93 |
| 7,435,899 B2 * | 10/2008 | Okada et al. | 174/36 |
| 7,667,140 B2 * | 2/2010 | Hock et al. | 174/117 F |
| 2005/0106934 A1 | 5/2005 | Hatori | |
| 2005/0148212 A1 | 7/2005 | Ojima et al. | |
| 2006/0090920 A1 | 5/2006 | Fujita | |

FOREIGN PATENT DOCUMENTS

| | | |
|---|---|---|
| JP | 7-212936 | 8/1995 |
| JP | 9-294320 | 11/1997 |
| JP | 2000-236608 | 8/2000 |

OTHER PUBLICATIONS

English language Abstract of JP 9-294320, Nov. 11, 1997.

* cited by examiner

METHOD OF COVERING WIRE HARNESS BRANCH SECTION WITH PROTECTOR AND BRANCH STRUCTURE OF WIRE HARNESS

BACKGROUND OF THE INVENTION

1. Field of the Invention

The present invention relates to a method of covering a wire harness branch section with a protector and a branch structure of a wire harness. Particularly, the present invention allows simple installation of a T-shaped protector to a T-shaped branch section of a main wire and a branch wire, which are respectively passed through corrugated tubes.

2. Description of Related Art

A wire harness routed to an automobile includes a branch wire branched from a main wire at a predetermined position and connected to an electric device mounted in a vehicle. A protector is conventionally used for a wire harness branch section, in order to fix the branch position and to protect electric wires exposed from corrugated tubes at the branch position when the main wire and the branch wire are passed through the corrugated tubes for bundling and protection. Conventionally, electric wires of a wire harness are taped and bundled in many cases. Since taping the wires requires proficient skills and work efforts, however, the electric wires are mostly passed through plastic corrugated tubes for bundling. When the corrugated tubes are used, the electric wires are exposed at the branch section of the T-shaped branch position, where the branch wire branches from the main wire, the branch section being sandwiched by both ends of the corrugated tubes through which the main wire is passed and an end of the corrugated tube through which the branch wire is passed. Thus, it is necessary to install a protector to the T-shaped branch section in order to cover the exposed electric wires at the branch section.

As a protector of this type, a protector 1 for a T-shaped branch section shown in FIG. 9 is known, for example. The protector 1 includes a pair of halved bodies 3 and 4 on right and left sides, which are formed by splitting a T-shaped tube into two and are connected via a hinge 2. The halved bodies 3 and 4 include main wire sections 3a and 4a and branch wire sections 3b and 4b, respectively. Both end portions of the main wire sections 3a and 4a and end portions of the branch wire sections 3b and 4b are provided with a plurality of ribs 5 on inner circumferences, the ribs being fitted into recesses on corrugated tubes. Further, opening and closing ends of the main wire sections 3a and 4a are provided with locking hooks 6a and locked portions 6b at mutually opposing positions; and opening and closing ends of the branch wire sections 3b and 4b are also provided with locking hooks 7a and locked portions 7b at mutually opposing positions. Thereby, the halved bodies 3 and 4 on the right and left sides are locked and connected when the halved bodies are closed and put together (refer to Japanese Patent Laid-open Publication H9-294320).

However, the protector above requires processes for manually folding, closing, and locking the halved bodies 3 and 4, thus requiring a number of installation processes and professional skills.

Patent document 1: Japanese Patent Laid-open Publication H9-294320

SUMMARY OF THE INVENTION

The present invention is provided to address the above-described problems. A main object of the present invention is to provide a method of covering a wire harness branch section with a protector, the method requiring a limited number of installation processes and enabling simple installation work which does not require a worker to have proficient skills. In addition, the present invention is intended to provide a method of installing a protector suitably applicable in a case where a wire harness is bundled and protected in corrugated tubes.

In order to solve the above-described problems, the present invention provides a method of covering a wire harness branch section with a protector, the branch section being a T-shaped section where a branch wire branches from a main wire of the wire harness, the protector being provided with a T-shaped cylindrical body including a lateral cylindrical section covering the main wire and a longitudinal cylindrical section covering the branch wire. The protector includes a main body and a cover, which are a pair of T-shaped semi-annular sections formed by splitting the T-shaped cylindrical body into two, and thin hinges connecting the main body and the cover at external split ends of the lateral cylinder semi-annular sections. The cover is placed over the main body pivoting the thin hinges, so that opening and closing ends provided opposite to each other on the lateral cylinder semi-annular sections of the main body and the cover are locked and connected, and that opening and closing ends provided opposite to each other on the longitudinal cylinder semi-annular sections are locked and connected. The method of covering the wire harness branch section with the protector includes hooking and placing the cover of the protector in an open state on an upper end portion of a pressing wall of a setting jig, which is provided with a main body receiving recess as an upper surface opening having a cross-sectionally arcuate shape and with the pressing wall projecting upward from one side end of the main body receiving recess; positioning and setting the main body above the main body receiving recess; inserting the main wire and the branch wire of the wire harness into the main body of the protector; and setting the wires into the main body receiving recess. Thereby, the pressing wall presses the cover; the cover rotates toward the main body; and locking portions provided on the main body engage with locked portions provided on the cover, thus locking the opening and closing ends of the lateral cylindrical section and the opening and closing ends of the longitudinal cylindrical section.

With use of the setting jig as described above, a worker only needs to accurately position and place the main wire and the branch wire of the wire harness on the main body of the protector, in order to complete work from covering the main body with the cover to locking the components. Thereby, the number of installation processes can be reduced and workability is enhanced. In addition, a worker conventionally needed to manually cover the main body with the cover and lock the components, while holding the wire harness branch section in an accurate position on the main body of the protector. Thus, a conventional method requires professional skills. Using the setting jig, however, allows a one-step installation and simplifies the work. Thus, even a novice worker can perform accurate and quick installation.

Both sides of the main wire and the branch wire, which constitute the T-shaped branch section of the wire harness, are respectively passed through corrugated tubes in advance. Internal circumferential surfaces of the main body and the cover of the protector are provided with ribs fitted into recesses provided on the corrugated tubes. The protector thus positions and holds the corrugated tubes for installation.

As described above, the main wire and the branch wire of the wire harness are passed through the corrugated tubes for bundling and protection in many cases. The protector is installed in order to protect wires exposed at the T-shaped branch section of the wire harness having the main wire and branch wire passed through the corrugated tubes. The internal circumferential surfaces of the main body and the cover of the protector are provided with the ribs fitted into the recesses provided on the corrugated tubes, as described above. Thus, when the recesses on a first semi-circular side of the corrugated tubes, through which the main wire and the branch wire of the wire harness are passed, are accurately positioned between the ribs on the main body of the protector, the recesses on a second semi-circular side of the corrugated tubes can be fitted automatically and accurately between the ribs of the cover. Thereby, the corrugated tubes can be positioned and held by the protector.

The method of covering the T-shaped branch section of the wire harness with the protector can be applied not only to the case where the main wire and the branch wire of the wire harness are passed through the corrugated tubes, but also to cases where electric wires are exposed at a T-shaped branch position, when a main wire and a branch wire are passed through round tubes for bundling and protection; electric wires are exposed at a T-shaped branch section, when a main wire and a branch wire of a wire harness are taped for bundling and protection; and further a T-shaped branch section is to be positioned, though electric wires are not taped or passed through tubes.

The thin hinges of the protector are provided with connecting pieces and biasing pieces, the connecting pieces connecting the main body and the cover, the biasing pieces projecting upward and having an inverted V shape so as to bias the main body and the cover in an opening direction when the main body and the cover are opened and arcuate sections are projected downward. The biasing pieces are displaced into a V shape projecting downward when the cover is pressed by the pressing wall, and thereby the cover is biased toward the main body for rotation in a closing direction.

The hinge structure above allows the cover to be stably held in an open state when the wire harness is inserted into the main body of the protector, thus providing a good workability. In addition, when the cover is placed over the main body, only a small force is required to be exerted to the cover in the closing direction to automatically rotate the cover therein, thus also providing a good workability.

The setting jig includes a main body receiver provided with the main body receiving recess and a cover receiver having a cross-sectionally arcuate shape and provided with an upper surface opening as a cover receiving recess, such that the main body receiver and the cover receiver are provided in parallel and that the cover receiving recess is positioned higher than the main body receiving recess. The main body receiving recess and the cover receiving recess have a T shape from a plain view corresponding to a shape of the main body and the cover, respectively. The cover receiver is connected to the main body receiver via the pressing wall on a side end of the main body receiver and is provided with a leg projecting downward on an opposite end, so as to be supported horizontally by the leg and the pressing wall.

When the setting jig is used, the cover can be set into the cover receiving recess when the cover is placed on the upper end portion of the pressing wall. Thereby, the protector is less instable and the stability of the protector is increased, and thus workability of inserting the wire harness into the main body is enhanced.

In addition, the present invention also provides a wire harness branch structure covered by a protector in the covering method above. A main wire and a branch wire of a wire harness are passed through corrugated tubes in advance. The present invention in particular prevents the protector from disengaging from the corrugated tubes when the protector is installed to a T-shaped branch section where electric wires are exposed as being sandwiched by the corrugated tubes, since recesses on the corrugated tubes are fitted and held between ribs of the protector.

As described above, the present invention allows easy and accurate installation of the protector to the wire harness branch section in a limited number of processes. Thereby, no professional skills are required to install the protector, and the workability can be improved. Particularly, when the electric wires of the wire harness are passed through the corrugated tubes for bundling and protection, the electric wires exposed at the T-shaped branch position can simply be covered and protected by the protector, the electric wires being sandwiched by the corrugated tubes of both sides of the main wire and the corrugated tube of the branch wire.

Further, the biasing pieces, which are provided on the thin hinges and displaced, bias the cover in the opening direction and thereby stably hold the cover in the open state, in a process of opening the cover for inserting the wire harness. In a process of closing the cover, the biasing pieces bias the cover in the closing direction so as to allow the cover to close automatically, thus improving the workability in these regards as well.

Figure 1:
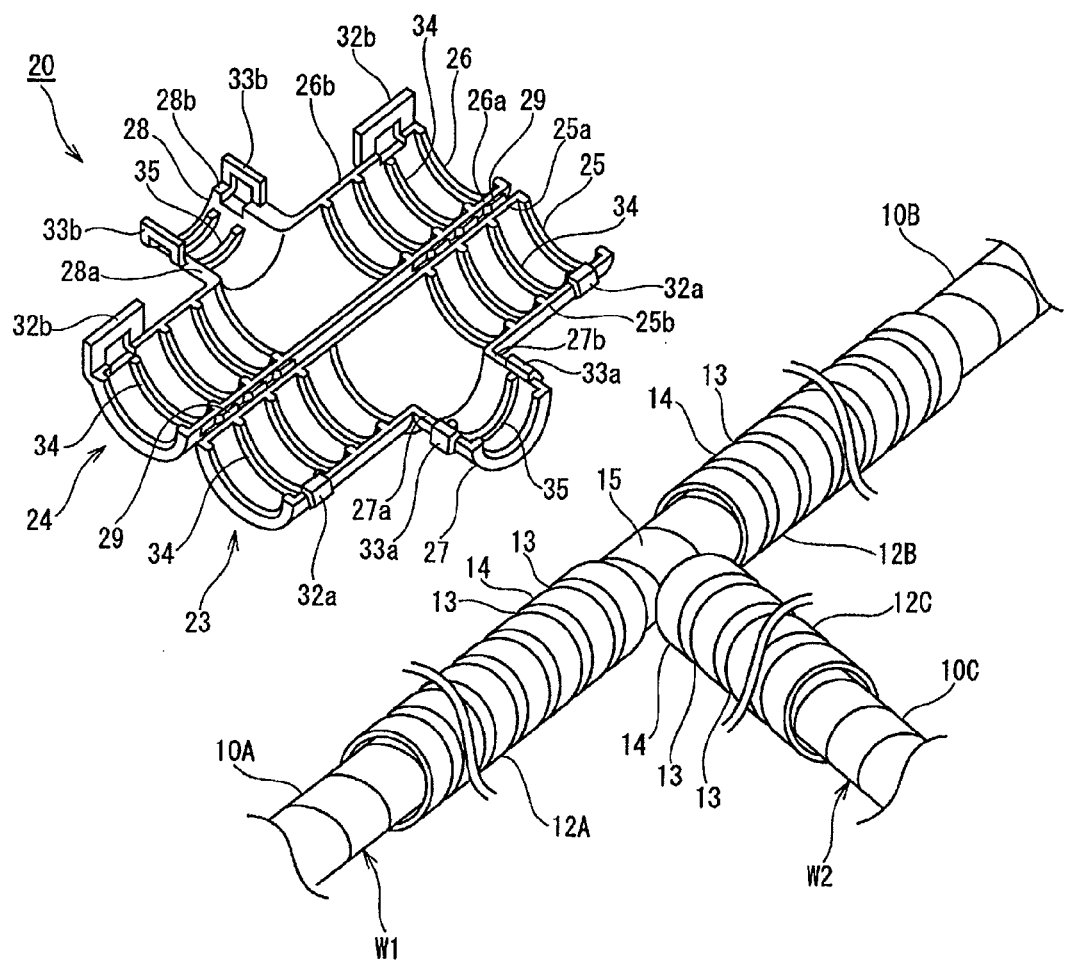
FIG. 1 a perspective view illustrating a protector and a wire harness branch section according to a first embodiment of the present invention.

W1 Main wire
W2 Branch wire
12A-12C Corrugated tube
20 Protector
21 Lateral cylindrical section
22 Longitudinal cylindrical section
23 Main body
24 Cover
29 Thin hinge
32*a*, 33*a* Locking hook
32*b*, 33*b* Locked portion
40, 50 Setting jig
43, 52 Main body receiving recess 44 Cover receiving recess
45, 53 Pressing wall

DETAILED DESCRIPTION OF PREFERRED EMBODIMENTS

The embodiments of the present invention are explained below with reference to the drawings. In any embodiments, the present invention is applied to a T-shaped branch section, where a branch wire W2 branches from a main wire W1 having a T shape, the branch wire and main wire being electric wires of a wire harness and being passed through corrugated tubes.

As shown in FIG. 1, electric wires 10A and 10B on both sides of the main wire W1 having the branch section in between are covered with corrugated tubes 12A and 12B, respectively; and electric wires 10C of the branch wire W2 are covered with a corrugated tube 12C to a branch position of the branch section. A middle portion of the branch section, however, is a portion of exposed electric wires 15, where the corrugated tubes 12A to 12C provided in three directions are cut away and thus the wires are not covered with the corrugated tubes 12A to 12C.

The corrugated tubes 12A to 12C are synthetic resin tubes alternately provided with recesses 13 and projections 14 in an axis line direction and having flexibility.

FIGS. 1 through 6B illustrate a first embodiment of the present invention. The drawings illustrate a method of covering the T-shaped branch section of the wire harness with a protector 20 and a wire harness branch structure where the protector 20 is installed in the covering method.

Figure 2:
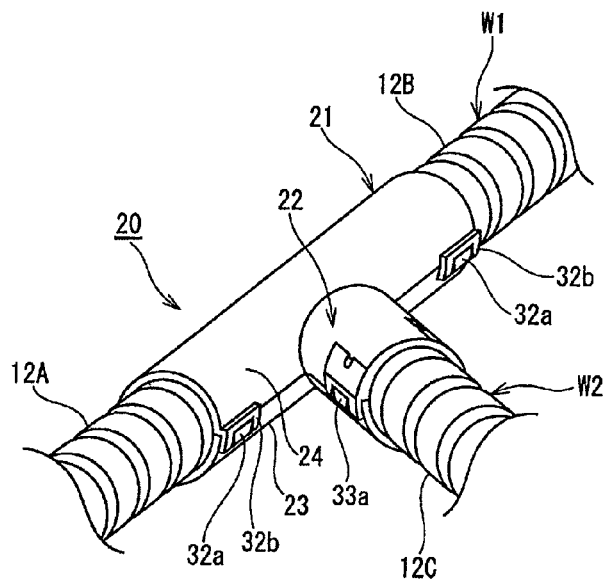
FIG. 2 is a perspective view illustrating the wire harness branch section covered with the protector.
Figure 3:
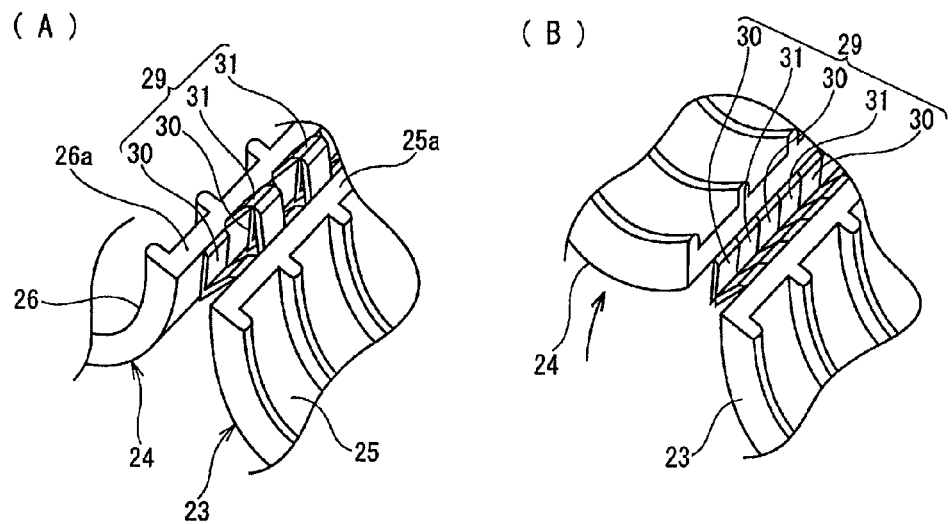
FIG. 3A is a perspective view illustrating a thin hinge of the protector shown in FIG. 1 when the protector is opened.
FIG. 3B is a perspective view illustrating the thin hinge of the protector shown in FIG. 1 when the protector is to be closed.

As shown in FIGS. 1 and 2, the protector 20 includes a main body 23 and a cover 24 openably and closably connected by thin hinges 29, the main body and cover being a pair of T-shaped semi-annular sections which are formed by halving a T-shaped cylindrical body. The T-shaped cylindrical body includes a lateral cylindrical section 21 covering the main wire W1 and a longitudinal cylindrical section 22 covering the branch line W2. Specifically, as shown in FIG. 2, the thin hinges 29 connect an external split end 25a of a lateral cylinder semi-annular section 25 of the main body 23 and an external split end 26a of a lateral cylinder semi-annular section 26 of the cover 24. The cover 24 is moved rotationally pivoting the thin hinges 29 so as to cover the main body 23, and thereby the lateral cylindrical section 21 and longitudinal cylindrical section 22 are provided, as shown in FIG. 2.

The thin hinges 29 are provided on both end portions of the lateral cylinder semi-annular sections 25 and 26 in a longitudinal direction. As shown in FIGS. 3A and 3B, each of the thin hinges 29 is alternately provided with a plurality of connecting pieces 30 and a plurality of biasing pieces 31 in the longitudinal direction of the lateral cylinder semi-annular sections 25 and 26, the connecting pieces connecting the main body 23 and the cover 24, the biasing pieces biasing the main body 23 and the cover 24 in opening and closing directions.

The connecting pieces 30 project downward having a V shape when the main body 23 and the cover 24 are opened and arcuate sections are projected downward, and bend and stretch while keeping the V shape according to opening and closing of the cover 24. The biasing pieces 31 project upward having an inverted V shape when the main body 23 and the cover 24 are opened and the arcuate sections are projected downward, and bias the main body and the cover in the opening direction, as shown in FIG. 3A. When the cover 24 is moved rotationally in the closing direction by a predetermined amount or more, the biasing pieces 31 are displaced to have a V shape projecting downward, as shown in FIG. 3B. The displacement biases and rotates the cover 24 toward the main body in the closing direction.

Locking hooks 32a are provided on an opening and closing end 25b of the lateral cylinder semi-annular section 25 of the main body 23, while locked portions 32b are provided opposite to the locking hooks 32a on an opening and closing end 26b of the lateral cylinder semi-annular section 26 of the cover 24. Further, locking hooks 33a are provided on both opening and closing ends 27a and 27b of a longitudinal cylinder semi-annular section 27 of the main body 23, while locked portions 28a and 28b are provided opposite to the locking hooks 33a on both opening and closing ends 28a and 28b of a longitudinal cylinder semi-annular section 28 of the cover 24.

On inner circumferential surfaces of the main body 23 and the cover 24, a plurality of ribs 34 are projected on the both longitudinal end portions of the lateral cylinder semi-annular sections 25 and 26, and a plurality of ribs 35 are projected on the end portion of the longitudinal cylinder sections 27 and 28. The ribs 34 and 35 are fitted into the recesses 13 of the corrugated tubes 12A to 12C.

Figure 4:
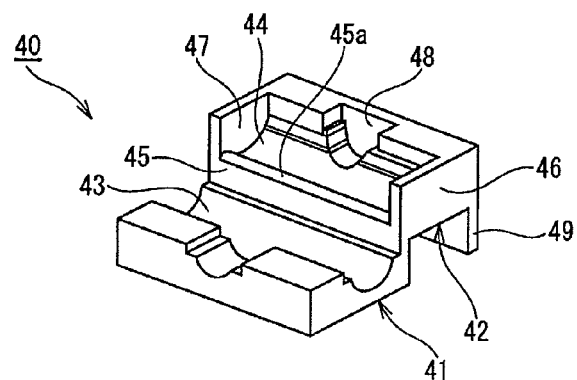
FIG. 4 is a perspective view illustrating a setting jig according to the first embodiment of the present invention.
Figure 5:
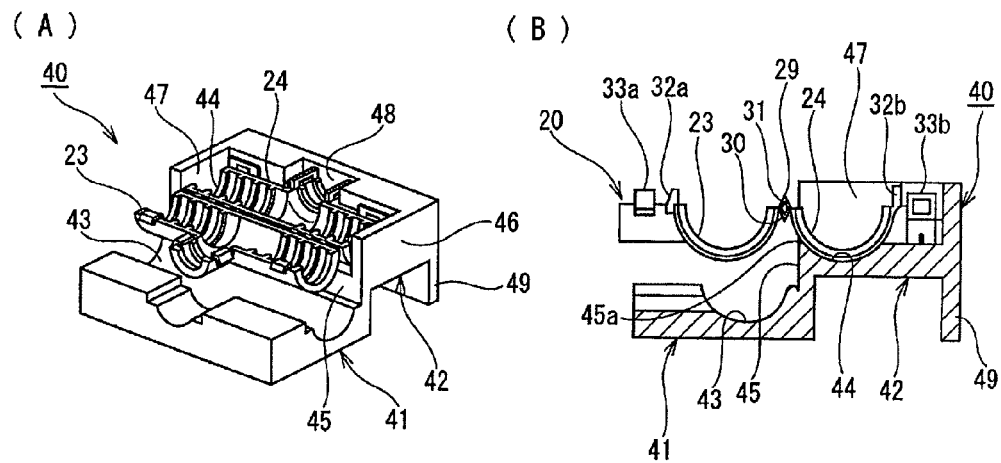
FIG. 5A is a perspective view illustrating the protector set in the setting jig shown in FIG. 4.
FIG. 5B is a cross-sectional view illustrating the protector set in the setting jig shown in FIG. 4.
Figure 6:
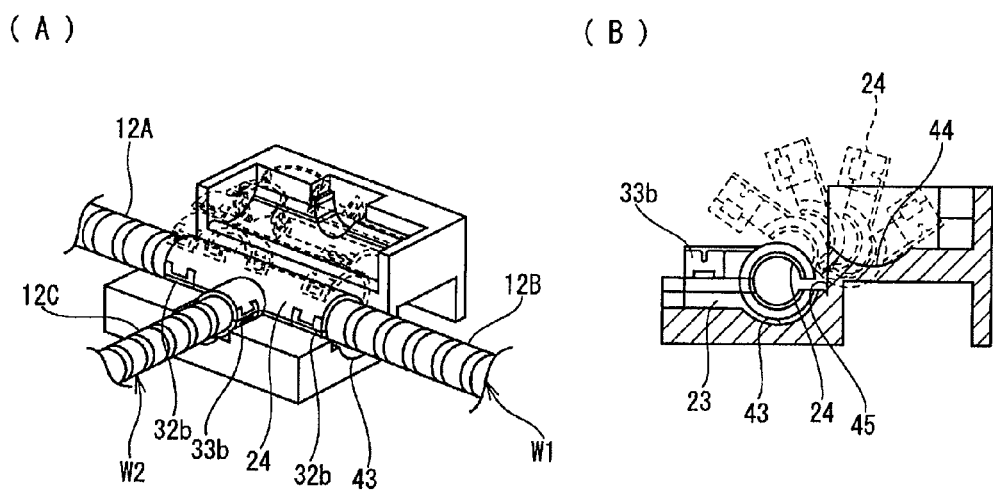
FIG. 6A is a schematic perspective view illustrating an operation to cover the wire harness branch section with the protector set in the setting jig shown in FIG. 4.
FIG. 6B is a cross-sectional view illustrating the operation to cover the wire harness branch section with the protector set in the setting jig shown in FIG. 4.

To install the protector 20 to a wire harness branch section, a setting jig 40 shown in FIG. 4 is used. The setting jig 40 includes a main body receiver 41 and a cover receiver 42, which correspond to the main body 23 and the cover 24, respectively, when the protector 20 is opened. A main body receiving recess 43 and a cover receiving recess 44 are provided as upper surface openings on upper surfaces of the main body receiver 41 and the cover receiver 42, respectively. Each of the recesses has an arcuate shape from a cross-sectional view and a T shape from a plain view. A pressing wall 45 partitions the recesses 43 and 44.

While the cover receiver 42 is provided with side walls 46, 47, and 48 that close three end portions of the T-shaped cover receiving recess 44, the main body receiver 41 is provided with open three end portions having no side walls to the T-shaped main body receiving recess 43.

The cover receiver 42 is provided higher than the main body receiver 41, such that the cover receiving recess 44 is positioned higher than the main body receiving recess 43. Specifically, the pressing wall 45 is vertically provided at a height difference between the cover receiver 42 and the main body receiver 41, and thereby the main body receiver 41 and the cover receiver 42 are connected via the pressing wall 45. In addition, an opposite end of the cover receiver 42 is provided with a leg 49 projecting downward, and thereby the cover receiver 42 is supported horizontally by the leg 49 and the pressing wall 45. The pressing wall 45 is provided lower than the side walls 46 to 48 of the cover receiver 42.

To cover the wire harness branch section with the protector 20 by using the setting jig 40, the cover 24 of the opened protector 20 is first fitted into the cover receiving recess 44 of the setting jig 40, as shown in FIG. 5A. Since the pressing wall 45, which partitions the cover receiving recess 44 and the main body recess 43, is provided low as described above, a part of the hinge 29 side of the cover 24 is projected from the cover receiving recess 44, and the cover 24 is hooked and placed on an upper end portion 45a of the pressing wall 45 projecting vertically upward, as shown in FIG. 5B. The main body 23 of the protector 20 is suspended above the main body receiving recess 43.

Subsequently, while the main wire W1 and the branch wire W2 at the T-shaped branch section of the wire harness are inserted into the suspended main body 23, the main body 23 is set into the main body receiving recess 43, as shown in FIGS. 6A and 6B. Thereby, the cover 24 placed on the upper cover receiving recess 44 comes down as being pulled by the main body 23 set into the lower main body receiving recess 43. At this time, an external surface of the cover 24 is pressed by the pressing wall 45 in the closing direction.

At this time, the biasing pieces 31 of the thin hinges 29 are displaced so as to bias the cover 24 in the closing direction, as shown in FIG. 3B. Then, the locking hooks 32a are inserted into and engaged with the locked portions 32b so as to lock and close the lateral cylindrical section 21, and the locking hooks 33a are inserted into and engaged with the locked portions 33b so as to lock and close the longitudinal cylindrical section 22. Further, the corrugated tubes 12A and 12B covering the main wire W1 and the corrugated tube 12C covering the branch wire W2 are positioned and held, as the ribs 34 of the main body 23 and the ribs 35 of the cover 24 are fitted into the recesses 13.

Finally, when the wire harness is removed from the setting jig 40, the wire harness branch section covered with the protector 20 is provided, as shown in FIG. 2.

As described above, using the setting jig 40 allows the protector to be installed to the wire harness branch section in a one-step operation in an accurate manner. Thereby, process time and steps are reduced, difficult professional skills are not required, and thus the workability is improved.

In addition, since the thin hinges 29 are provided with the connecting pieces 30 and the biasing pieces 31, the cover 24 can stably be held open as being biased in the opening direction while the wire harness branch section is being inserted into the protector 20. When the cover 24 is closed, the biasing pieces 31 are displaced so as to bias the cover 24 in the closing direction, thus providing a good workability.

Figure 7:
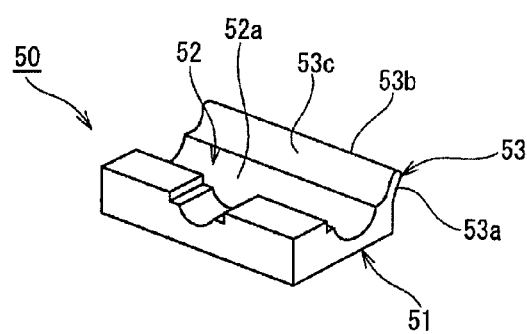
FIG. 7 is a perspective view illustrating a setting jig according to a second embodiment of the present invention.
Figure 8:
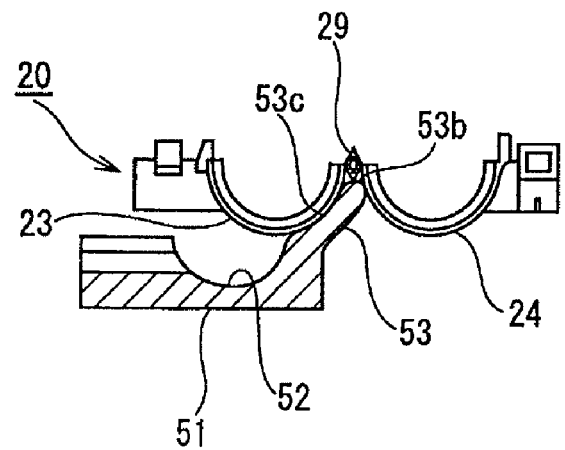
FIG. 8 is a cross-sectional view illustrating the protector set in the setting jig shown in FIG. 7.
Figure 9:
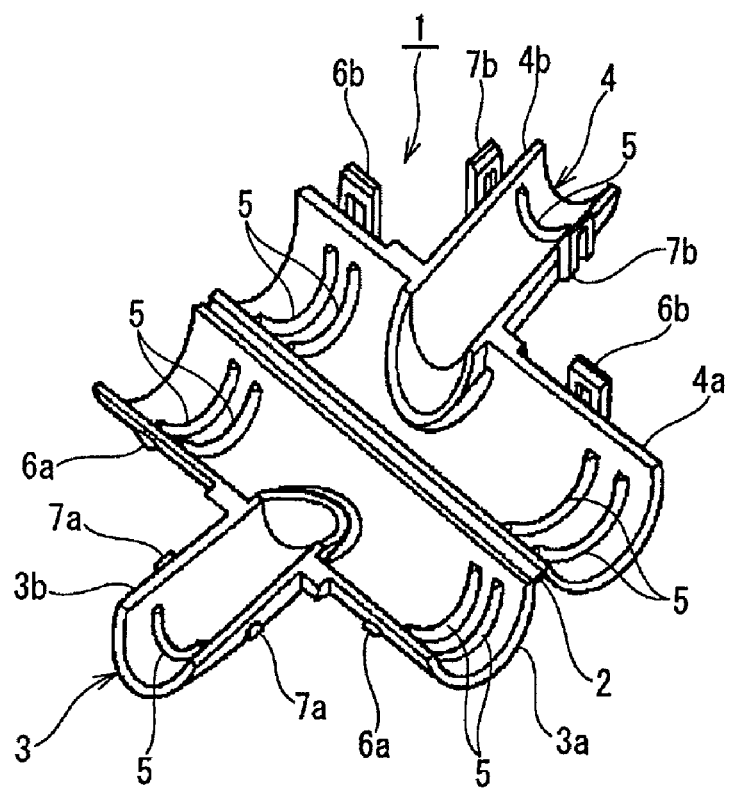
FIG. 9 illustrates a conventional example.

FIGS. 7 and 8 illustrate a setting jig 50 used in a second embodiment of the present invention. The setting jig 50 includes a main body receiver 51 and a pressing wall 53 alone, the main body receiver being provided with a main body receiving recess 52. The setting jig 50 is different from the setting jig 40 of the first embodiment in that no cover receiver is provided.

Specifically, the setting jig 50 is provided with the main body receiving recess 52 as an upper surface opening on an upper surface of the main body receiver 51, the recess having an arcuate shape from a cross-sectional view and a T shape from a plain view. A pressing wall 53 is provided obliquely upward in an external direction, projecting from a side end of a lateral cylindrical recess 52a of the main body receiving recess 52 in parallel therewith. The pressing wall 53 has a cross-sectionally arcuate shape having a continuing arcuate portion 53c projecting obliquely downward in a longitudinal direction.

To install the protector 20 using the setting jig 50 having the above-described structure, the cover 24 of the opened protector 20 is hooked on an upper end portion 53b of the pressing wall 53, as shown in FIG. 8. A part of the main body 23 is placed on the oblique upper surface 53c of the pressing wall 53, and the main body 23 of the protector 20 is set while being suspended above the main body receiving recess 52. In this state, while the wire harness branch section is inserted into the main body 23, the main body 23 is set into the main body receiving recess 52. Thereby, the cover 24 is pressed by the pressing wall 53 in the closing direction so as to cover the main body 23 for locking and closing. Steps thereafter are the same as those in the first embodiment.

What is claimed is:

1. A method of covering a wire harness branch section with a protector, the branch section being a T-shaped section where a branch wire branches from a main wire of the wire harness, the protector being provided with a T-shaped cylindrical body including a lateral cylindrical section covering the main wire and a longitudinal cylindrical section covering the branch wire, the protector comprising:
   a main body and a cover, which are a pair of T-shaped semi-annular sections formed by splitting the T-shaped cylindrical body into two; and
   thin hinges connecting the main body and the cover at external split ends of the lateral cylinder semi-annular sections; wherein
   the cover is placed over the main body pivoting the thin hinges, so that first opening and closing ends provided opposite to each other on the lateral cylinder semi-annular sections of the main body and the cover are locked and connected, and that second opening and closing ends provided opposite to each other on the longitudinal cylinder semi-annular sections are locked and connected; the method comprising:
   hooking and placing the cover of the protector in an open state on an upper end portion of a pressing wall of a setting jig, which is provided with a main body receiving recess as an upper surface opening having a cross-sectionally arcuate shape and with the pressing wall projecting upward from one side end of the main body receiving recess;
   positioning and setting the main body above the main body receiving recess;
   inserting the main wire and the branch wire of the wire harness into the main body of the protector;
   setting the wires into the main body receiving recess; and thereby the pressing wall presses the cover; the cover rotates toward the main body; and locking portions provided on the main body engage with locked portions provided on the cover, thus locking the first opening and closing ends of the lateral cylindrical section and the second opening and closing ends of the longitudinal cylindrical section.

2. The method of covering the wire harness branch section with the protector according to claim 1, wherein:
   both sides of the main wire and the branch wire constituting the T-shaped branch section of the wire harness are respectively passed through corrugated tubes in advance; and
   internal circumferential surfaces of the main body and the cover of the protector are provided with ribs fitted into recesses provided on the corrugated tubes; the method further comprising:
   positioning and holding the corrugated tubes with the protector.

3. The method of covering the wire harness branch section with the protector according to claim 2, wherein the thin hinges of the protector is provided with connecting pieces and biasing pieces, the connecting pieces connecting the main body and the cover, the biasing pieces projecting upward and having an inverted V shape so as to bias the main body and the cover in an opening direction when the main body and the cover are opened and arcuate sections are projected downward, the method further comprising:
   displacing the biasing pieces into a V shape projecting downward when the cover is pressed by the pressing wall, and thereby the cover is biased toward the main body for rotation in a closing direction.

4. The method of covering the wire harness branch section with the protector according to claim 3, wherein:
   the setting jig includes a main body receiver provided with the main body receiving recess and a cover receiver having a cross-sectionally arcuate shape and provided with an upper surface opening as a cover receiving recess, such that the main body receiver and the cover receiver are provided in parallel and that the cover receiving recess is positioned higher than the main body receiving recess;

the main body receiving recess and the cover receiving recess have a T shape from a plain view corresponding to a shape of the main body and the cover, respectively; and the cover receiver is connected to the main body receiver via the pressing wall on a side end of the main body receiver and is provided with a leg projecting downward on an opposite end, such that the cover receiver is supported horizontally by the leg and the pressing wall.

5. A wire harness branch structure covered by the protector in the covering method according to claim 4.

6. A wire harness branch structure covered by the protector in the covering method according to claim 3.

7. The method of covering the wire harness branch section with the protector according to claim 2, wherein:

the setting jig includes a main body receiver provided with the main body receiving recess and a cover receiver having a cross-sectionally arcuate shape and provided with an upper surface opening as a cover receiving recess, such that the main body receiver and the cover receiver are provided in parallel and that the cover receiving recess is positioned higher than the main body receiving recess;

the main body receiving recess and the cover receiving recess have a T shape from a plain view corresponding to a shape of the main body and the cover, respectively; and the cover receiver is connected to the main body receiver via the pressing wall on a side end of the main body receiver and is provided with a leg projecting downward on an opposite end, such that the cover receiver is supported horizontally by the leg and the pressing wall.

8. A wire harness branch structure covered by the protector in the covering method according to claim 7.

9. A wire harness branch structure covered by the protector in the covering method according to claim 2.

10. The method of covering the wire harness branch section with the protector according to claim 1, wherein the thin hinges of the protector is provided with connecting pieces and biasing pieces, the connecting pieces connecting the main body and the cover, the biasing pieces projecting upward and having an inverted V shape so as to bias the main body and the cover in an opening direction when the main body and the cover are opened and arcuate sections are projected downward, the method further comprising:

displacing the biasing pieces into a V shape projecting downward when the cover is pressed by the pressing wall, and thereby the cover is biased toward the main body for rotation in a closing direction.

11. The method of covering the wire harness branch section with the protector according to claim 10, wherein:

the setting jig includes a main body receiver provided with the main body receiving recess and a cover receiver having a cross-sectionally arcuate shape and provided with an upper surface opening as a cover receiving recess, such that the main body receiver and the cover receiver are provided in parallel and that the cover receiving recess is positioned higher than the main body receiving recess;

the main body receiving recess and the cover receiving recess have a T shape from a plain view corresponding to a shape of the main body and the cover, respectively; and the cover receiver is connected to the main body receiver via the pressing wall on a side end of the main body receiver and is provided with a leg projecting downward on an opposite end, such that the cover receiver is supported horizontally by the leg and the pressing wall.

12. A wire harness branch structure covered by the protector in the covering method according to claim 11.

13. A wire harness branch structure covered by the protector in the covering method according to claim 10.

14. The method of covering the wire harness branch section with the protector according to claim 1, wherein:

the setting jig includes a main body receiver provided with the main body receiving recess and a cover receiver having a cross-sectionally arcuate shape and provided with an upper surface opening as a cover receiving recess, such that the main body receiver and the cover receiver are provided in parallel and that the cover receiving recess is positioned higher than the main body receiving recess;

the main body receiving recess and the cover receiving recess have a T shape from a plain view corresponding to a shape of the main body and the cover, respectively; and the cover receiver is connected to the main body receiver via the pressing wall on a side end of the main body receiver and is provided with a leg projecting downward on an opposite end, such that the cover receiver is supported horizontally by the leg and the pressing wall.

15. A wire harness branch structure covered by the protector in the covering method according to claim 14.

16. A wire harness branch structure covered by a protector in the covering method according to claim 1.

* * * * *